US009864949B1

(12) United States Patent
Astigarraga et al.

(10) Patent No.: US 9,864,949 B1
(45) Date of Patent: Jan. 9, 2018

(54) COGNITION MODEL-BASED PRODUCT ASSIST

(71) Applicant: International Business Machines Corporation, Armonk, NY (US)

(72) Inventors: Tara Astigarraga, Fairport, NY (US); Itzhack Goldberg, Haifa (IL); Jose R. Mosqueda Mejia, Puruandiro (MX); Daniel J. Winarski, Tucson, AZ (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/339,284

(22) Filed: Oct. 31, 2016

(51) Int. Cl.
G06N 3/00 (2006.01)
G06N 7/00 (2006.01)
G06N 99/00 (2010.01)
G06Q 30/06 (2012.01)

(52) U.S. Cl.
CPC ............ *G06N 3/006* (2013.01); *G06N 7/005* (2013.01); *G06N 99/005* (2013.01); *G06Q 30/0625* (2013.01)

(58) Field of Classification Search
CPC .......... G06N 3/006; G06N 5/02; G06N 5/022; G06N 5/04; G06N 7/005; G06N 99/005; G06Q 30/0625
USPC .......................................................... 706/11
See application file for complete search history.

(56) References Cited

U.S. PATENT DOCUMENTS

| 6,990,491 | B2 | 1/2006 | Dutta et al. |
| 7,773,096 | B2 | 8/2010 | de Souza et al. |
| 2005/0015255 | A1 | 1/2005 | Kaye et al. |
| 2010/0122334 | A1* | 5/2010 | Stanzione .......... G06Q 10/0637 726/11 |
| 2010/0250605 | A1 | 9/2010 | Pamu et al. |
| 2015/0221118 | A1* | 8/2015 | Shaburova .............. G06T 5/005 345/423 |
| 2015/0254247 | A1* | 9/2015 | Bostick ............. G06F 17/30684 707/724 |
| 2015/0356407 | A1* | 12/2015 | Faith ..................... H04W 4/025 706/46 |

OTHER PUBLICATIONS

Miles C. et al., "Improve the customer experience with cognitive computing and IBM Watson", developerWorks, Aug. 1, 2016.*

(Continued)

*Primary Examiner* — Dave Misir
(74) *Attorney, Agent, or Firm* — Kunzler Law Group

(57) ABSTRACT

An open domain question answering apparatus includes a communication parser and a machine learning module. The communication parser parses a communication from a user account. The communication parser uses a natural language interpretation algorithm to construct a query and identify a product. The machine learning module is coupled to the communication parser and populates a plurality of potential responses to the query based on data associated with the identified product. Each of the plurality of potential responses has an associated level of detail. The machine learning module applies a machine learning user capacity model to the plurality of potential responses to identify a response with an associated level of detail commensurate with the machine learning user capacity model. The machine learning user capacity model is trained using data relating to a cognitive capacity of the user account.

20 Claims, 6 Drawing Sheets

(56) References Cited

OTHER PUBLICATIONS

"Echo & Alexa", http://www.amazon.com/Amazon-SK705DI-Echo/dp/B00X4WHP5E, known about as ealry as Jun. 2015, last accessed on Oct. 26, 2016, 11 pages.
2016 Goals: Facebook's Mark Zuckerberg Sets Out to Build AI Home Asistant, Secure World article, https://www.secureworldexpo.com/2016-goals-facebooks-mark-zuckerberg-sets-out-build-ai-home-assistant , Jan. 7, 2016, 1 page.
"JIBO", https://www.jibo.com/, 2016, 11 pages.
Lamont, J. "Cognitive Computing: Real-world applications for an emerging technology". Trend-Setting Products 2015, 24(8). Source: KMWorld.com, 4 pages.
IBM Technical Support Services. IBM article, Sep. 2014, 6 pages.
Bataller, C. & Harris, J. "Turning Cognitive Computing Into Business Value Today", Accenture brochure, 2015, 16 pages.
Mounier, G. "What is Cognitive Computing and how does it impact customer experience?" Call Center Times, Mar. 17, 2015, 3 pages.

\* cited by examiner

COGNITION MODEL-BASED PRODUCT ASSIST

FIELD

The subject matter disclosed herein relates to customer product assistance and more particularly relates to cognition model-based product assistance.

BACKGROUND

Conventional customer support systems rely upon a customer service representative to field questions about a product and provide a solution. Customers locate information for contacting customer support, locate information identifying the product such as a serial number, contact customer support, explain the problem to customer support, and resolve the problem by getting customer support to understand the problem and come up with a resolution the customer understands. Some systems may offer systems to assist the customer support representative in diagnosing the problem with pre-assembled potential solutions. Other conventional systems provide an automated menu-based support system that the customer navigates through online or over-the-phone interactions.

BRIEF SUMMARY

An open domain question answering apparatus is disclosed. The apparatus includes a communication parser and a machine learning module. The communication parser parses a communication. The communication is received from a user account. The communication parser uses at least one natural language interpretation algorithm to construct a query and identify a product associated with the query. The machine learning module is coupled to the communication parser. The machine learning module populates a plurality of potential responses to the query based on data associated with the identified product. Each of the plurality of potential responses has an associated level of detail. The machine learning module applies a machine learning user capacity model to the plurality of potential responses to identify a response with an associate level of detail commensurate with the machine learning user capacity model. The machine learning user capacity model is trained using data relating to a cognitive capacity of the user account to understand and follow an instruction. At least a portion of the communication parser and the machine learning module includes one or more of hardware and executable code. The executable code is stored on one or more computer readable storage media.

A method is also disclosed. The method includes receiving a communication from a user account. The method also includes parsing the communication to identify a query and a product associated with the query by analyzing the communication with an open domain question answering module operating at least one natural language interpretation algorithm. The method also includes populating a plurality of potential responses to the query based on data associated with the identified product. Each of the plurality of potential responses has an associated level of detail. The method also includes applying a machine learning user capacity model to the plurality of potential responses to identify a response having an associated level of detail commensurate with the machine learning user capacity model. The machine learning user capacity model is trained using data relating to a cognitive capacity of the user account with respect to the identified product. The method also includes sending the identified response to the user account.

A computer program product for providing product support is also disclosed. The computer program product includes a computer readable storage medium having program instructions embodied therewith. The program instructions readable/executable by a processor to cause the processor to parse, by the processor, a video stream from a user account using at least one natural language interpretation algorithm and at least one visual recognition algorithm to identify a query associated with a product. The program instructions readable/executable by a processor to cause the processor to populate, by the processor, a plurality of potential responses to the query based on data corresponding to the associated product. Each of the plurality of potential responses has an associated level of detail. The program instructions readable/executable by a processor to cause the processor to apply, by the processor, a machine learning user capacity model to the plurality of potential responses to identify a response having an associated level of detail commensurate with the machine learning user capacity model. The machine learning user capacity model is trained using data relating to a cognitive capacity of the user account with respect to the identified product. The program instructions readable/executable by a processor to cause the processor to generate, by the processor, a video overlay applied to the video steam to communicate the identified response to the user account.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
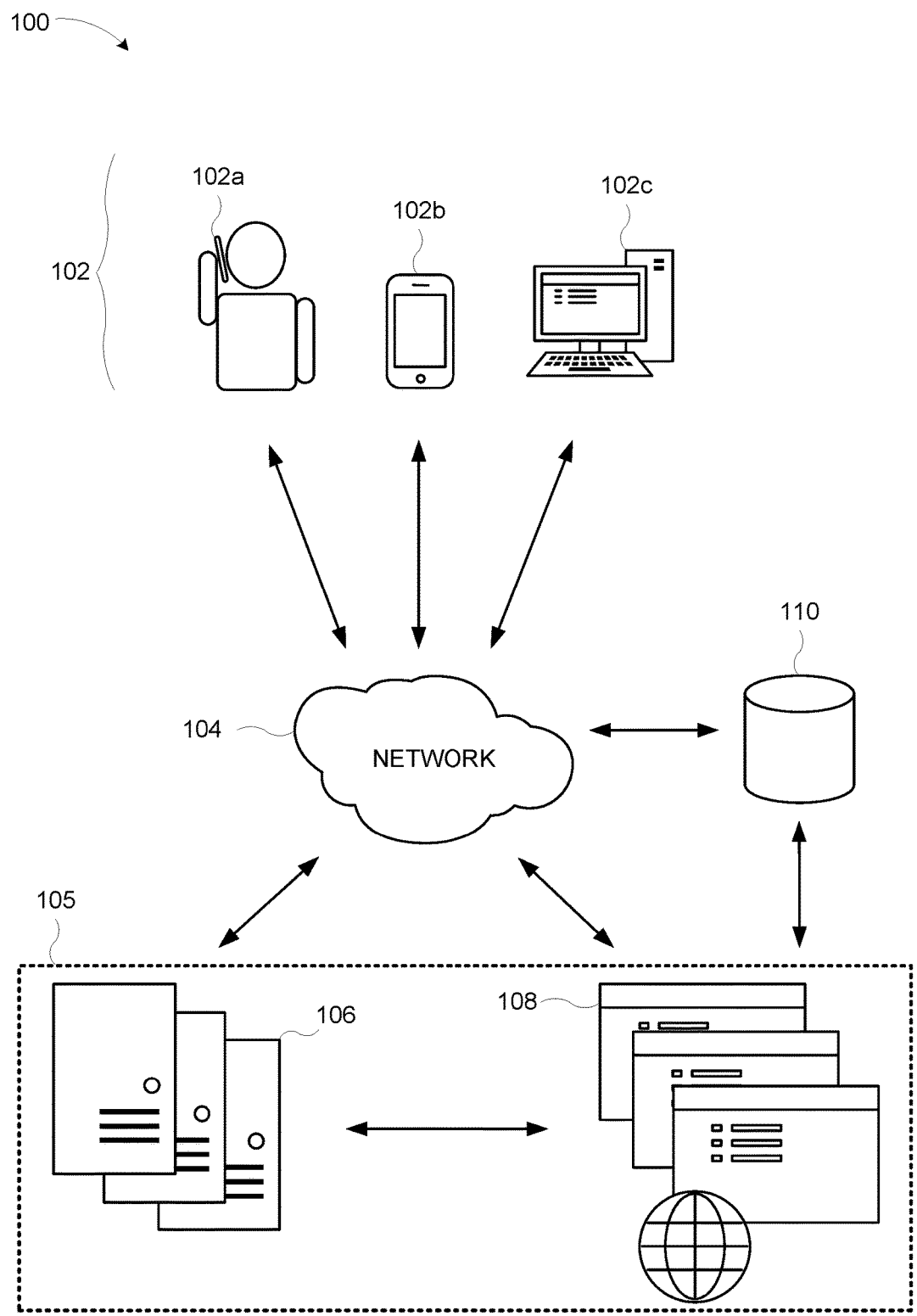
FIG. 1 is a schematic diagram illustrating one embodiment of an open domain question answering system in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network.

The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product.

Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product.

Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed and executed through either a remote-access or a site-to-site VPN. When using the remote-access VPNs the computer program product is deployed, accessed and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

Embodiments of an open domain question answering system described below focus on creating a link between information available for a product or service and the ability, skill, state of mind, and capacity of the user. One example of the system allows a user to pose a question in an intuitive manner (i.e. using voice, text, video, etc.) to the system through an application or other interface.

The system provides an answer to the question which is formulated based on the user's ability to understand the content and level of detail of the answer. For example, if a user would like to know how to turn on a new computer they have purchased, they may simply submit their question (by speaking, typing, initiating a video exchange, chat, or otherwise pose) their question asking how they might turn on their computer.

The response for a user of a less sophisticated capacity may be "Push the red power button on the front right corner of the device for three seconds to power on the device." The response for a user of a more sophisticated capacity may be "Hold the power button for three seconds." As another example, two different users may want to know how to get started with a new product. The first user, based on their determined capacity, may receive a response such as "Using a Phillips screwdriver, remove the screw from the rectangular plate on the back of the product and insert four AA batteries in the manner shown on the diagram under the plate." A second user, based on their determined capacity, may receive a response such as "Install four AA batteries."

If a user is provided with responses that are aligned with their own ability to understand and execute, the risk of injury, damage to a product, frustration, improper negative feedback, and waste are reduced. These and other aspects and details are described in greater detail below with respect to the various Figures.

FIG. 1 is a schematic diagram illustrating one embodiment of an open domain question answering system 100 in accordance with one embodiment of the present invention. In the illustrated embodiment, the open domain question answering system 100 includes a user interface device 102 (depicted as a telephone 102a, a smart phone 102b, or a computer 102c). In one embodiment, the user interface device 102 is an audio telephone 102a on which the user calls in for customer service. In another embodiment, the user interface device 102 is a smartphone 102b.

The smartphone 102b may execute an application local to the smartphone 102b or interface with an application at another location such as the server 106. For example, the user interface device 102 may access a web interface, an embedded application, a mobile application, etc. In another embodiment, the user may access a computer 102c such as a desktop, laptop, tablet, terminal, or other computational device. In one embodiment, the user may provide identifying information to log in, verify a user identity, or otherwise specify a user account at the user interface device 102.

The user interface device 102 is connected to a network 104. In one embodiment, the user interface device 102 is connected to the network 104 via a wired connection. In another embodiment, the user interface device 102 is connected to the network 104 via a wireless connection. Various arrangements and embodiments of the network 104 are described above. A customer may interact with the network 104 through the user interface device 102 to contact an open domain question answering apparatus 105. In one embodiment, the open domain question answering apparatus 105 includes one or more servers 106. In another embodiment, the open domain question answering apparatus 105 includes one or more applications 108. In other embodiments, the server 106 interfaces with the application 108.

The application 108 may be executed locally on the server 106 or executed at a location remote to the server 106. The user interface device 102 provides information, relating to the user account corresponding to the customer, to the open domain question answering apparatus 105 via the network 104. In one embodiment, the open domain question answering apparatus 105 receives the user account information. In another embodiment, the open domain question answer apparatus 105 receives the information relating to the user account and accesses the user account based on this information. Greater detail on the information accessed by the open domain question answer apparatus 105 is discussed below with relation to FIG. 5.

The open domain question answering apparatus 105 accesses data from a data repository 110. In one embodiment, the data repository 110 is a network connected component. In another embodiment, the data repository 110 is an asset local to the open domain question answering apparatus 105. In some embodiments, the data repository 110 is a public data repository. In other embodiments, the data repository 110 is a private data repository. In some embodiments, the data repository 110 may include a combination of private and public data. The open domain question answering apparatus 105 may access the data repository 110 based on the user account information. The data repository 110 may include structured or unstructured data or a combination of structured and unstructured data.

The open domain question answering apparatus 105 receives a communication from the user interface device 102. The open domain question answering apparatus 105 parses the communication from the user interface device 102 to construct a query and identify a product associated with the query. In some embodiments, the user interface device 102 sends product information to the open domain question answering apparatus 105. The product information may include a product identifier such as a barcode, pattern code, serial number, batch number, etc.

The open domain question answering apparatus 105 may identify a product based on the communication or product identifier and access data from the repository 110 relating to the product. The open domain question answering apparatus 105 further constructs the query from the communication. In one embodiment, the open domain question answering apparatus 105 applies at least one natural language interpretation algorithm. The open domain question answering apparatus 105 also includes a machine learning module. The machine learning module is described in greater detail relative to FIG. 4.

The module may be applied to the data based on the constructed query to populate a plurality of potential responses. In one embodiment, the plurality of potential responses is extracted from data corresponding to the identified product. The machine learning module applies a user capacity model to the plurality of potential responses. The user capacity model is described in greater detail below with reference to FIG. 5.

The user capacity model is trained using the user account information. Once trained, the user capacity model describes a cognitive capacity of the user. In the trained state, the user capacity model is capable of identifying a response from the plurality of responses. The identified response is selected as having a level of detail commensurate with the cognitive capacity of the user as described by the user capacity model. In this manner, the identified response contains a level of detail which the user is capable of understanding and following to resolve the communication. The identified response is communicated to the user interface device 102 via the network 104.

In some embodiments, the response may include a textual response, an audio response, or a video response. For example, the response may include an email sent to the user account, a text-based message pop-up, an audio file that is sent over the phone or through another application, a video file that is sent, a real-time video stream, a video stream overlay of the solution that is applied to a video stream received from the user interface device in real-time or asynchronously, a video stream with an avatar demonstrating a solution or step, or other communication forms. In some embodiments, the open domain question answering apparatus 105 requests follow up to verify a resolution of the communication or prompt further communications or feedback.

Additional functionality may be included in the open domain question answering apparatus 105. For example, in some embodiments, the open domain question answering apparatus 105 checks the user account, sending the communication, to validate a subscription or candidacy of the user account to receive services from the open domain question answering apparatus 105.

In some embodiments, the open domain question answering apparatus 105 may validate the product identifier received from the user interface device 102. Validation may involve verifying that a product is supported, that a manufacturer maintains a subscription or membership to the service, or that a licensing agreement is still effective for the product. Other validations and checks may be performed on the product, the user account, the connections through the network 104, the data on the data repository 110 or the data repository 110 itself. More or less functionality may be accomplished by the open domain question answering system 100.

Figure 2:
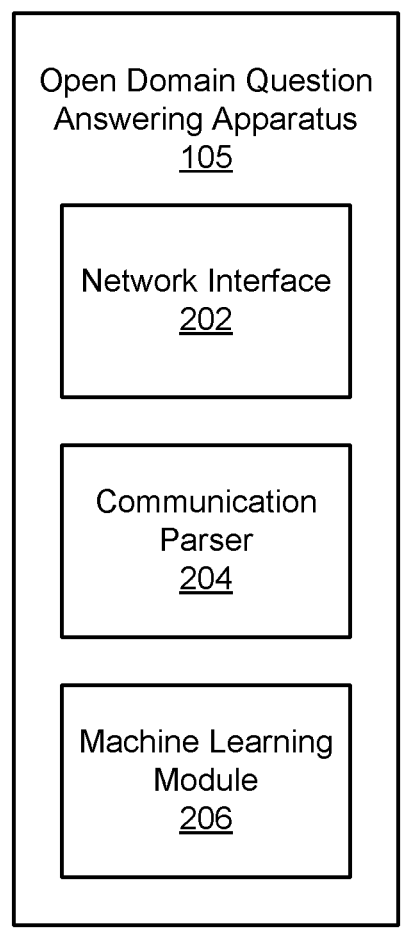
FIG. 2 is a schematic diagram illustrating one embodiment of an open domain question answering apparatus in accordance with one embodiment of the present invention.

FIG. 2 is a schematic diagram illustrating one embodiment of an open domain question answering apparatus 105 in accordance with one embodiment of the present invention. The illustrated embodiment of the open domain question answering apparatus 105 includes a network interface 202, a communication parser 204, and a machine learning module 206.

The network interface 202 provides a connection with the network 104, of FIG. 1, or other devices, such as the data repository 110 of FIG. 1. The network interface 202 may include hardware, software, or a combination of hardware and software. The network interface 202 may be a network interface controller, a network interface card, a network adapter, a LAN adapter, a physical network interface, or other connection device. In some embodiments, the network interface 202 is configured to operate transmit queues and receive queues to manage packets between the open domain question answering apparatus 105 and the network 104.

The communication parser 204 processes the communication from the user interface device 102 of FIG. 1 to construct the query and identify a product associated with the query. The parser 204 takes in the communication as input data and builds a data structure. The data structure may be a parse tree, abstract syntax tree, or other hierarchical structure. The parser 204 may be a one-pass or multiple-pass parser. The communication parser 204 outputs the query and identifies a plurality of potential responses to the query from the data repository or other resources.

The machine learning module 206 builds, trains, and updates a user capacity model. The machine learning module 206 executes analytical approaches to manage the user capacity model and customize the model to the user's capacity based on a variety of factors and variables that are described in greater detail with reference to FIG. 4. The user capacity model is applied to the plurality of potential responses to identify a response based on the user's cognitive capacity described by the user capacity model.

Figure 3:
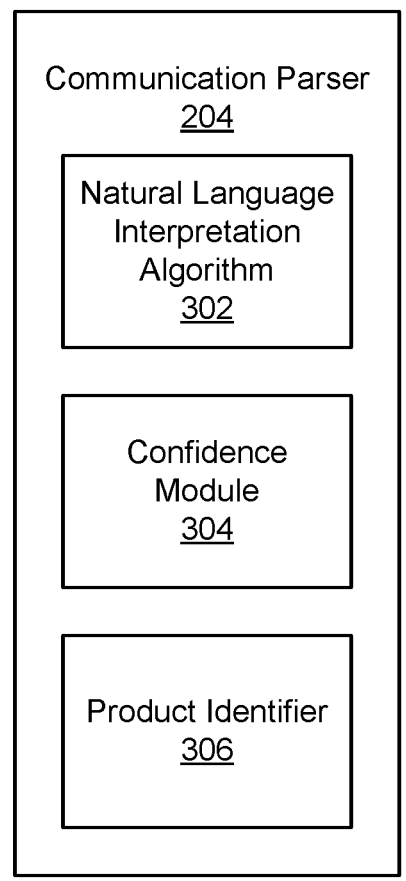
FIG. 3 is a schematic diagram illustrating one embodiment of a communication parser in accordance with one embodiment of the present invention.

FIG. 3 is a schematic diagram illustrating one embodiment of a communication parser 204 in accordance with one embodiment of the present invention. The parser 204 includes a natural language interpretation algorithm 302, a confidence module 304, and a product identifier 306.

The natural language interpretation algorithm 302 is configured to take in a communication from a user that includes an audio, video, or textual input. In one embodiment, the natural language interpretation algorithm 302 analyzes the communication and assigns a question type to the communication. The natural language interpretation algorithm 302 extracts keywords, tagged portions of the communication, or other aspects of the communication. In some embodiments, the natural language interpretation algorithm 302 includes one or more specialized elements to analyze the communication. For example, the natural language interpretation algorithm 302 may include keyword extractor, a lexical dictionary, a thesaurus database, a word tagger, a named entity recognizer, and other special purpose modules or systems.

The confidence module 304 determines a level of confidence relating to the query result output by the natural language interpretation algorithm 302. In some embodiments, the confidence module 304 executes a confidence interval algorithm to rank multiple parsing runs or separate parses of the communication from the user. In some embodiments, the confidence module 304 targets a confidence level of 95%. In other embodiments, the confidence module 304 may target a confidence level of 90% or 99% or another target confidence level. In another embodiment, the confidence module 304 determines a confidence level for each of a plurality of parses of the communication. From the plurality of parses of the communication, the communication parser 204 selects the parse having the highest level of confidence as the query.

The product identifier 306 takes in the communication and identifies a product from the contents of the communication. The product may be identified in the communication by a bar code, a pattern code, a serial number, an image, a keyword, or some other identifying information. The product identifier 306 extracts and interprets the information identifying the product from the communication. The product identifier 306 accesses information relating to the identified product and provides the accessed information to the open question answering apparatus 105. The information can be used by the open domain question answering apparatus 105 to focus an analysis on a portion of data corresponding to the product. The portion of data corresponding to the product may include manuals, service information, technical specifications, manufacturer data, or other sources.

Figure 4:
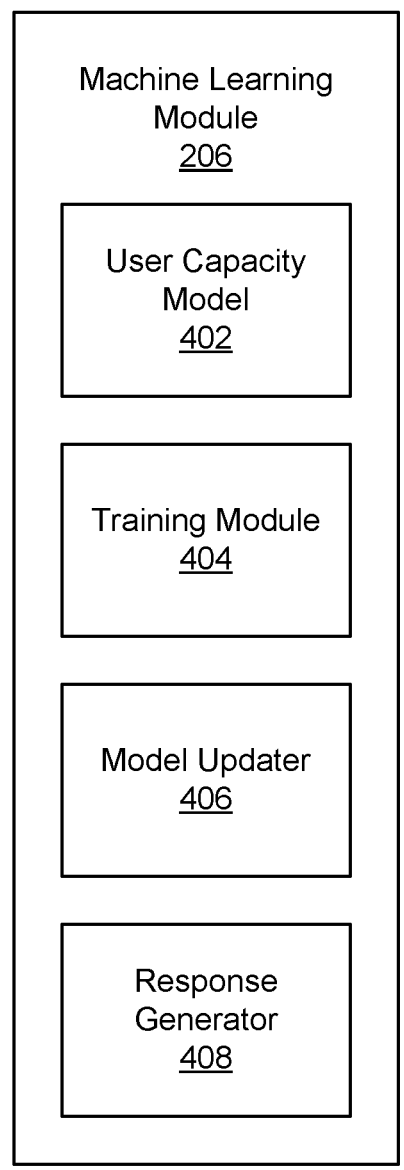
FIG. 4 is a schematic diagram illustrating one embodiment of a machine learning module in accordance with one embodiment of the present invention.

FIG. 4 is a schematic diagram illustrating one embodiment of a machine learning module 206 in accordance with one embodiment of the present invention. The machine learning module 206 includes a user capacity model 402, a training module 404, a model updater 406, and a response generator 408. The user capacity model 402 is derived from information relating to the user account. The user capacity model 402 describes a level of cognitive capacity of a user based on information described in greater detail with respect to FIG. 5. The user capacity model 402 may provide a complex approach to identifying a response to the communication from the user. The user capacity model 402 may include a binary classification model, a multiclass classification model, a regression model, or some other modeling structure or approach.

The training module 404 provides training for the user capacity model 402. The training module 404 provides training data that contains fixed query/response sets. The training data is used to train the user capacity model 402 on known data. In some embodiments, the training process creates the user capacity model 402 during an activation, registration, or initialization stage for the user account. The model updater 406 provides data to the user capacity model 402 to update the user capacity model 402 to improve accuracy, response time, or another performance metric.

The response generator 408 receives the plurality of potential responses and generates a response to be sent to the user. In one embodiment, the response generator 408 generates a textual response that is sent on to the user interface device via email, text, chat, video, or other communication systems. In another embodiment, the response generator 408 generates an audio response or video response. Other response types or organizations may also be used.

Figure 5:
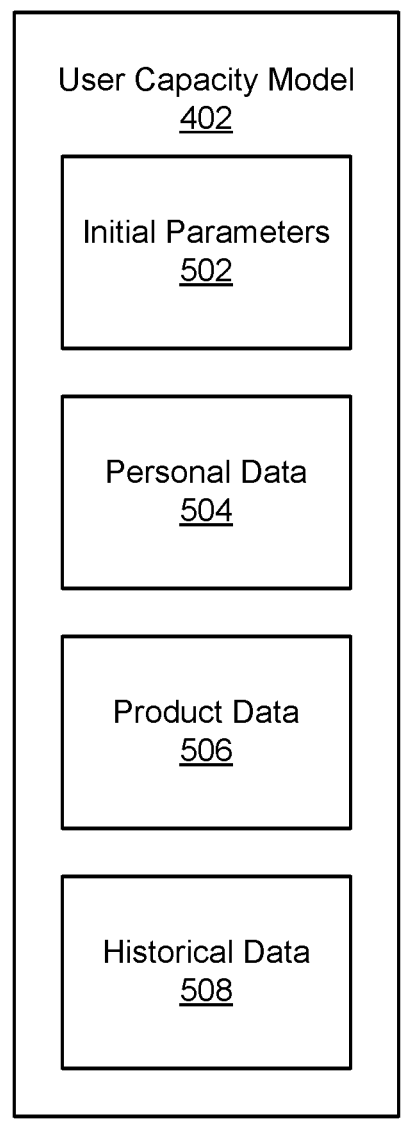
FIG. 5 is a schematic diagram illustrating one embodiment of a user capacity model in accordance with one embodiment of the present invention.

FIG. 5 is a schematic diagram illustrating one embodiment of a user capacity model 402 in accordance with one embodiment of the present invention. The user capacity model 402 includes initial parameters 502, personal data 504, product data 506, and historical data 508.

In one embodiment, the initial parameters 502 are a default starting point for the user capacity module 402. In some embodiments, the initial parameters 502 are initial parameters assigned to the user account based on data corresponding to activity on the user account. The initial parameters 502 may also include a default language or user-specified language. In another embodiment, the initial parameters 502 are a standard set of parameters applied prior to modification of the user capacity model 402 based on the personal data 504, the product data 506, and the historical data 508 of the user account.

In one embodiment, the personal data 504 includes data pertaining to the user of the user account. For example, the personal data 504 may include name, gender, age, ethnicity, birthplace, preferred language, marital status, children, occupation, education, training, certifications, technical experience, etc. In some embodiments, the personal data 504 is entered by the user. In another embodiment, the personal data 504 is extracted, mined, or otherwise obtained from one or more locations such as social media or other public or private records.

The product data 506 includes information corresponding to the product identified from the communication. In some embodiments, the product data 506 includes product information gathered from or provided by a manufacturer, service provider, or retailer of the product. In some embodiments, the product data 506 includes technical specifications, service manuals, user manuals, instructions, forums, whitepapers, data sheets, frequently-asked-questions resources, common issues databases, or other sources.

One embodiment of the historical data 508 includes data relating to one or more previous interactions with the user account. For example, the historical data 508 may include previous communication resolutions, surveys, questions, feedback, comments, or ratings corresponding to the user account. In another embodiment, the historical data 508 includes data relating to interactions from other user accounts regarding the product. Other historical data 508 may be collected and used to build or update the user capacity model 402.

Figure 6:
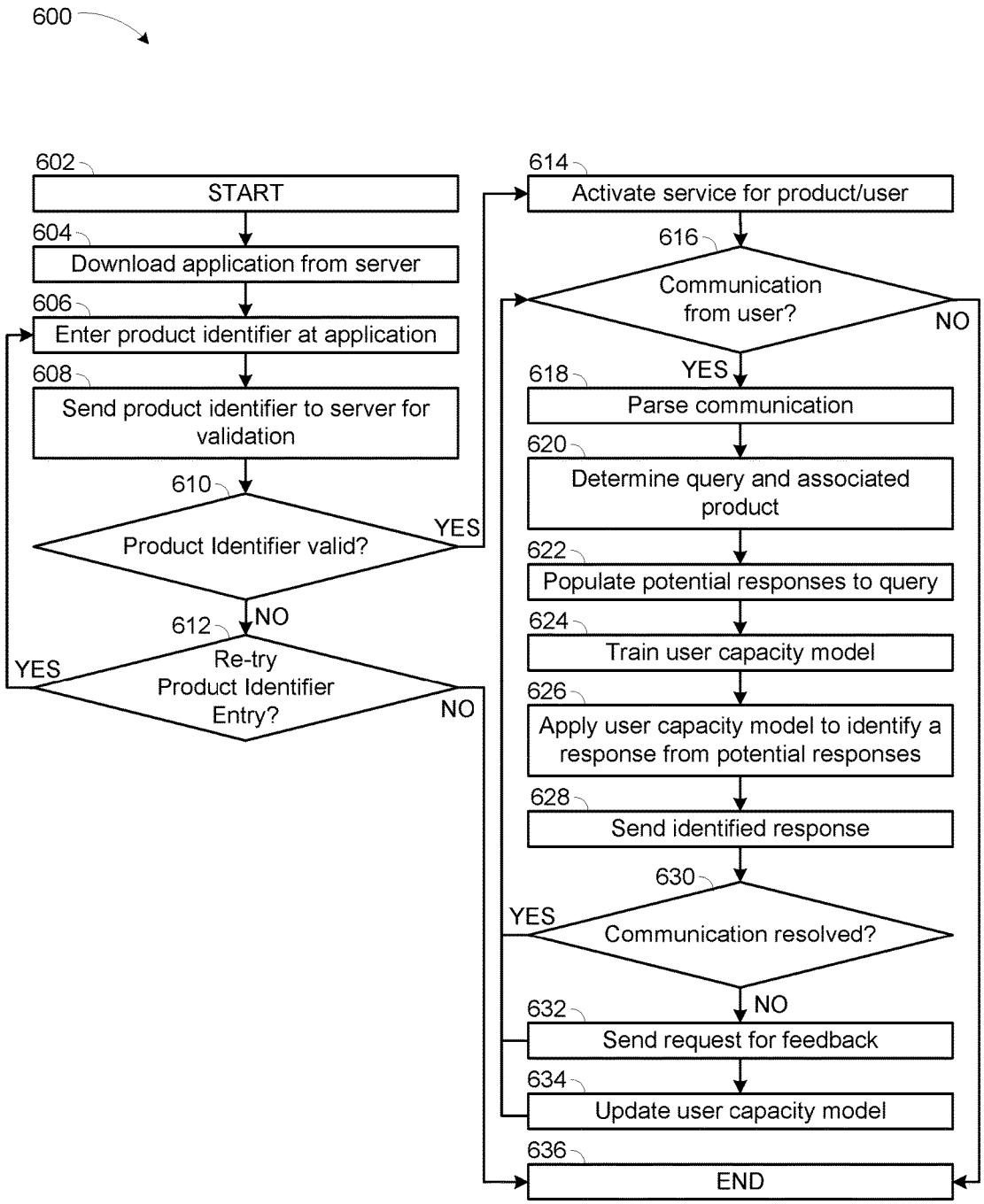
FIG. 6 is a schematic flow chart diagram illustrating one embodiment of a method in accordance with one embodiment of the present invention.

FIG. 6 is a schematic flow chart diagram illustrating one embodiment of a method 600 in accordance with one embodiment of the present invention. The method 600 begins at block 602. At block 604, a user device downloads an application from a server. The user device may be a smart phone, personal computer, tablet, laptop, etc. The server may include embodiments of the server 106 of FIG. 1 or other servers such as a central application server.

At block 606, the application facilitates entry of a product identifier such as a bar code, model number, serial number, etc. The product identifier may be entered by submission of an image, number, audio scan, etc. At block 608, the application sends the product identifier to a server for validation. At block 610, the product identifier is validated. If the product identifier is successfully validated, the service is activated for the product or user at block 614. If the product is not successfully validated at block 610, the user interface device may prompt a re-try of the product identifier entry at block 612. If no re-try is made, the method 600 ends at block 636.

Once the product is successfully validated, at block 610, and the service activated, at block 614, a communication is awaited at block 616. While no communication is detected, the method 600 ends at block 636. If a communication is detected from a user interface device, at block 616, the communication is parsed at block 618. Parsing the communication yields a query and an associated product determined at block 620. In some embodiments, the query may be determined and the product identified from the query. At block 622, potential responses to the query are populated. In some embodiments, the potential responses are generated by the machine learning module 206 of FIG. 4. In some embodiments, the user capacity model is trained at block 624.

In some embodiments, the user capacity model is sufficiently trained and needs not be updated. At block 626, the user capacity model is applied to identify a response from the potential responses. In some embodiments, identifying the response includes applying the model to select a response with a level of detail matching a capacity of the user to understand the response. At block 628, the identified response is sent to the user interface device. If, at block 630, further communication is received, the method reverts to block 616 to formulate a new response. If the communication is not resolved, a request for feedback is requested at block 632. Feedback may constitute a communication which continues the method 600 at block 616. The feedback may also trigger, at block 634, an update to the user capacity model. Once the user capacity model is updated, further communications may be awaited at block 616. If no further communications are received, the depicted embodiment of the method 600 ends at block 636.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An open domain question answering apparatus comprising:
   a communication parser that parses a communication, received from a user account, using at least one natural language interpretation algorithm to construct a query and identify a product associated with the query; and
   a machine learning module, coupled to the communication parser, that:
      populates a plurality of potential responses to the query based on data associated with the identified product, wherein each of the plurality of potential responses has a level of detail unique among the plurality of potential responses; and
      applies a machine learning user capacity model, describing a level of a cognitive capacity of the user account, to the plurality of potential responses to identify a response, from the plurality of potential responses, having an associated level of detail commensurate with the level of the cognitive capacity of the user account described by the machine learning user capacity model, and communicating the identified response to the user account wherein the machine learning user capacity model is trained using data relating to the cognitive capacity of the user account to understand and follow an instruction;
   wherein at least a portion of the communication parser and the machine learning module comprises one or more of hardware and executable code, the executable code stored on one or more computer readable storage media.

2. The apparatus of claim 1, wherein the machine learning module further updates the machine learning user capacity model for the user account based on an effectiveness of the identified response.

3. The apparatus of claim 2, wherein the effectiveness of the identified response is based on a user feedback corresponding to the identified response.

4. The apparatus of claim 2, wherein the effectiveness of the identified response is based on a number of interactions to reach a resolution of the communication from the user account.

5. The apparatus of claim 1, wherein the data associated with the identified product comprises at least one of structured data and unstructured data.

6. The apparatus of claim 1, further comprising a confidence module that determines a confidence rating for at least one of an accuracy of the query relative to the communication and an accuracy of the identified response.

7. The apparatus of claim 1, wherein the communication from the user account comprises a video communication.

8. The apparatus of claim 7, wherein the plurality of potential responses comprises at least one video response.

9. The apparatus of claim 8, wherein the at least one video response comprises an edit to the video communication from the user account.

10. A method comprising:
   receiving a communication from a user account;
   parsing the communication to identify a query and a product associated with the query by analyzing the communication with an open domain question answering module operating at least one natural language interpretation algorithm;

populating a plurality of potential responses to the query based on data associated with the identified product, wherein each of the plurality of potential responses has a level of detail unique among the plurality of potential responses;

applying a machine learning user capacity model, describing a level of a cognitive capacity of the user account, to the plurality of potential responses to identify a response, from the plurality of potential responses, having an associated level of detail commensurate with the machine learning user capacity model, wherein the machine learning user capacity model is trained using data relating to the cognitive capacity of the user account with respect to the identified product; and sending the identified response to the user account.

11. The method of claim 10, wherein the identified response comprises an edited version of the communication, wherein the edited version of the communication comprises an image demonstrating a solution to the communication.

12. The method of claim 10, wherein the data relating to the cognitive capacity of the user account comprises historical interaction data of the user account.

13. The method of claim 10, wherein the data relating to the cognitive capacity of the user account comprises at least one question answered on the user account.

14. The method of claim 10, wherein populating the plurality of potential responses to the query further comprises analyzing at least one of structured data and unstructured data.

15. A computer program product for providing support for a product, the computer program product comprising a computer readable storage medium having program instructions embodied therewith, the program instructions readable/executable by a processor to cause the processor to:

parse, by the processor, a video stream from a user account using at least one natural language interpretation algorithm and at least one visual recognition algorithm to identify a query associated with the product;

populate, by the processor, a plurality of potential responses to the query based on data corresponding to the associated product, wherein each of the plurality of potential responses has a level of detail unique among the plurality of potential responses;

apply, by the processor, a machine learning user capacity model, describing a level of a cognitive capacity of the user account, to the plurality of potential responses to identify a response, from the plurality of potential responses, having an associated level of detail commensurate with the level of the cognitive capacity of the user account described by the machine learning user capacity model, wherein the machine learning user capacity model is trained using data relating to the cognitive capacity of the user account with respect to the identified product; and generate, by the processor, a video overlay applied to the video stream to communicate the identified response to the user account.

16. The computer program product of claim 15, wherein the program instructions are further to cause the processor to receive a product identifier from the user account and identify the product associated with the product identifier.

17. The computer program product of claim 16, wherein the product identifier includes at least one of an alphanumeric code, a bar code, a QR code, and an image of the product.

18. The computer program product of claim 15, wherein the program instructions are further to cause the processor to provide an updated response based on a communication from the user account detected during the video stream.

19. The computer program product of claim 15, wherein the program instructions are further to cause the processor to update the machine learning user capacity model based on a resolution metric of the video stream.

20. The computer program product of claim 19, wherein the resolution metric comprises at least one of a time to resolution, a number of exchanges, and a user satisfaction rating.

\* \* \* \* \*